(12) United States Patent
Burgdorf et al.

(10) Patent No.: US 6,920,965 B2
(45) Date of Patent: Jul. 26, 2005

(54) SPOT-TYPE DISC BRAKE WITH A SPRING ASSEMBLY FOR A BRAKE PAD

(75) Inventors: Jochen Burgdorf, Offenbach (DE); Helmut Kast, Frankfurt (DE); Rudolf Thiel, Frankfurt am Main (DE); Ralf Sundheim, Frankfurt (DE); Kurt Lehmann, Clarkston, MI (US)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/916,174

(22) Filed: Jul. 26, 2001

(65) Prior Publication Data

US 2002/0043436 A1 Apr. 18, 2002

(30) Foreign Application Priority Data

Oct. 18, 2000 (DE) .......................... 100 51 798
Apr. 3, 2001 (DE) .......................... 101 16 598

(51) Int. Cl.$^7$ .......................... F16D 65/40; B60T 11/00; F16F 1/12
(52) U.S. Cl. .................. 188/73.38; 188/344; 267/179
(58) Field of Search ..................... 188/73.38, 73.36, 188/73.37, 73.1, 73.35, 250 E, 18 A, 370, 72.1, 72.3, 250 D, 250 G, 218 XL, 344, 325; 267/165, 179, 180, 182

(56) References Cited

U.S. PATENT DOCUMENTS

| | | | | | |
|---|---|---|---|---|---|
| 3,722,634 A | * | 3/1973 | Ogasawara et al. | ...... | 188/73.37 |
| 3,841,444 A | * | 10/1974 | Baum et al. | ...... | 188/72.3 |
| 3,931,871 A | * | 1/1976 | Martin | ...... | 188/344 |
| 4,085,827 A | * | 4/1978 | Kestermeier | ...... | 188/1.11 W |
| 4,342,381 A | * | 8/1982 | Tamura | ...... | 188/73.38 |
| 4,354,581 A | * | 10/1982 | Birkenbach et al. | .. | 188/196 BA |
| 4,364,455 A | * | 12/1982 | Oshima | ...... | 188/1.11 W |
| 4,444,296 A | * | 4/1984 | Marianu | ...... | 188/72.2 |
| 4,487,296 A | * | 12/1984 | Schreiner et al. | ...... | 188/73.38 |
| RE31,794 E | * | 1/1985 | Burgdorf et al. | ...... | 188/73.35 |
| 4,516,666 A | * | 5/1985 | Sheill | ...... | 188/73.1 |
| 4,537,288 A | * | 8/1985 | Stoka | ...... | 188/71.8 |
| 4,613,019 A | * | 9/1986 | Giorgetti | ...... | 188/73.31 |
| 4,669,583 A | * | 6/1987 | Mery | ...... | 188/205 A |
| 4,673,065 A | * | 6/1987 | Gerard et al. | ...... | 188/73.38 |
| 4,677,420 A | * | 6/1987 | Topic et al. | ...... | 116/208 |
| 4,702,351 A | * | 10/1987 | Price et al. | ...... | 164/47 |
| 4,881,623 A | * | 11/1989 | Kondo | ...... | 188/73.38 |

(Continued)

FOREIGN PATENT DOCUMENTS

| | | | |
|---|---|---|---|
| DE | 2074261 A | * | 10/1981 |
| DE | 3130185 A1 | * | 4/1982 |
| DE | 3419541 A1 | * | 11/1985 |
| DE | 3608577 A1 | * | 9/1987 |
| EP | 0469310 A1 | * | 2/1992 |
| GB | 2147673 A | * | 5/1985 |
| WO | WO-9800647 A1 | * | 1/1998 |

*Primary Examiner*—Xuan Lan Nguyen
(74) *Attorney, Agent, or Firm*—Honigman Miller Schwartz and Cohn LLP (57) ABSTRACT

The present invention relates to a spot-type disc brake with a brake housing straddling a brake disc, with at least one brake pad that is arranged in the brake housing so as to be slidable in the actuating direction and cooperates tribologically with the brake disc upon brake application, with at least one actuating device arranged in the brake housing to apply an actuating force to the brake pad, and with a spring assembly for the active adjustment of a clearance between the brake pad and the brake disc after brake application. To simplify the configuration of the spring assembly, the spring assembly comprises exactly one spring which is secured detachably in the spot-type disc brake and is supported on the brake pad and on the brake housing. A spring of this type is arranged advantageously symmetrically within the brake housing to prevent an undesirable inclined positioning of the brake pads.

19 Claims, 5 Drawing Sheets

U.S. PATENT DOCUMENTS

| | | | | |
|---|---|---|---|---|
| 4,927,124 A | * | 5/1990 | Spedding et al. | 267/229 |
| 5,069,313 A | * | 12/1991 | Kato et al. | 188/72.3 |
| 5,249,647 A | * | 10/1993 | Kobayashi et al. | 188/72.3 |
| 5,251,727 A | * | 10/1993 | Loeffler et al. | 188/73.38 |
| 5,257,679 A | * | 11/1993 | Weiler et al. | 188/250 B |
| 5,310,024 A | * | 5/1994 | Takagi | 188/72.3 |
| 5,330,035 A | * | 7/1994 | Klimt et al. | 188/250 E |
| 5,358,079 A | * | 10/1994 | Brown | 188/73.36 |
| 5,494,139 A | * | 2/1996 | Le Deit et al. | 188/196 F |
| 5,687,817 A | * | 11/1997 | Kobayashi et al. | 188/72.3 |
| 5,704,452 A | * | 1/1998 | Maligne | 188/73.38 |
| 5,829,555 A | * | 11/1998 | Anda et al. | 188/72.3 |
| 5,957,442 A | * | 9/1999 | Hensley | 267/180 |
| 6,179,095 B1 | * | 1/2001 | Weiler et al. | 188/73.38 |
| 6,318,514 B1 | * | 11/2001 | Hinkens et al. | 188/73.38 |

* cited by examiner

SPOT-TYPE DISC BRAKE WITH A SPRING ASSEMBLY FOR A BRAKE PAD

TECHNICAL FIELD

The present invention generally relates to vehicle brakes, and more particularly relates to a spot-type disc brake with a spring assembly for the active adjustment of a clearance between a brake pad and a brake disc.

BACKGROUND OF THE INVENTION

DE 31 30 185 A1 discloses a disc brake with resetting springs. The disc brake includes two resetting springs spaced in a circumferential direction and abutting with free spring legs on brake pads arranged on either side of the brake disc. The brake pads are lifted from the brake disc after a brake operation due to the spreading effect of the spring legs. The springs are compressed between a brake holder, a brake caliper and the brake pads in a first assembly. The resetting springs are anchored only insufficiently in the disc brake so that the resetting springs may easily be detached and lost, especially when exposed to vibrations. In a second design, the resetting springs are screwed to the disc brake. However, this necessitates an undesirable additional fastening means for each resetting spring. In addition, the use of two resetting springs basically involves the risk that in the event of failure of one of the resetting springs there will occur an inclined position of a brake pad which impairs functioning.

In view of the above, an object of the present invention is to disclose a spot-type disc brake with a spring assembly for the clearance adjustment at one brake pad, which overcomes the shortcomings known from the state of the art and, in addition, is easy to handle.

This object of the present invention is achieved by a spot-type disc brake assembly which includes a brake housing straddling a brake disc, with at least one brake pad that is arranged in the brake housing so as to be slidable in the actuating direction and cooperates tribologically with the brake disc upon brake application. At least one actuating device to apply an actuating force to the brake pad is incorporated in the brake housing. To adjust a clearance between the brake pad and the brake disc upon termination of brake application, the spot-type disc brake includes a spring assembly which comprises exactly one spring that is secured detachably to the spot-type disc brake and is supported on the brake pad, on the one hand, and on the brake housing, on the other hand. In particular the detachable attachment of the spring on a brake housing permits an especially simple manipulation of the subassembly composed of brake housing, brake pad, and spring. Also, the spring is easy to mount and dismount.

An advantageous embodiment of the spot-type disc brake is achieved in that the spring extends substantially in the central plane of the brake housing with respect to the circumferential direction of the brake disc. Thus, an undesirable inclined positioning of the brake pad is avoided even in the extremely unlikely case of failure of the spring. In any case, the general braking function will not be impaired, not even when such a failure occurs.

A preferred variation of the spot-type disc brake is achieved when the spring is supported on a brake pad which directly cooperates with at least one actuating device. This relates to spot-type disc brakes both in a fixed-type caliper and a floating-caliper construction, with a floating-caliper disc brake including a corresponding actuating device only on one side of the brake disc. The action of the spring directed to the brake pad close to the actuating device has a particularly positive effect on the clearance adjustment.

To facilitate the ability of mounting and dismounting of the spring, it may be provided that the spring with a first end portion is inserted into an accommodation recess at the brake pad. The end portion of the spring is fixed within the accommodation recess so as to prevent the end portion from slipping out of the accommodation recess. Above all in arrangements of the spot-type disc brake wherein two or more actuating devices apply a brake force to the brake pad, it is appropriate that the first end portion of the spring is supported in a circumferential direction between two actuating devices on the brake pad. This achieves a symmetrical application of the spring force to the brake pad and prevents an inclined positioning of brake pads.

In an expedient embodiment, the spring is configured as a tension spring that is suspended with a second end portion on the brake housing. A tension spring of this type is a standard component permitting low-cost application in the spring assembly of the present invention. The tension spring is preferably made of helical wire and suspended with a second end portion in a brake housing bore, for example. According to an alternative variation, the spring may of course also be designed as a compression spring which is detachably fastened on the brake housing.

Another favorable spring variation is achieved because the spring is configured as a spiral leg spring which is detachably fastened with a second end portion on the brake housing and acts as a bending spring. Above all, such a leg spring necessitates little mounting space and can be adapted flexibly to any respective installation specifications by simple shaping measures at its free ends. More particularly, the spring legs are configured in conformity with the preset supporting points on the brake housing or on the brake pad. It is suitable above all in this connection that at least one spring portion is shaped at the spring and supported on the brake housing in a circumferential direction. This improves anchoring of the spring on the brake housing, and lateral tilting of the spring with respect to the circumferential direction is prevented.

DETAILED DESCRIPTION OF THE PREFERRED EMBODIMENTS

The spot-type disc brake 1 of an automotive vehicle shown in the Figures comprises a brake holder 2 mounted fast on the vehicle and a brake housing 3 slidably mounted on the brake holder 2. More particularly, housing 3 is designed as a brake caliper straddling a brake disc (not shown). On one side of the brake disc, the brake housing 3 includes at least one actuating device 4 for the application of brake pads 5, 6 arranged on either side of the brake disc. Each brake pad 5, 6 includes a friction lining 14 and a carrier plate 15. During a brake application, a first brake pad 5 is applied by the actuating device 4 directly and a second brake pad 6 is pressed due to an axial shift of the brake housing 3 indirectly against the brake disc. In the Figures, embodiments of the brake housing with two actuating devices 4 are shown which are designed as a hydraulic piston-and-cylinder unit. It is of course also possible to use pneumatically, electrically, or mechanically acting actuating devices 4.

The embodiment of the spot-type disc brake 1 according to the present invention is not limited to the arrangement of a defined number of actuating devices 4 in the brake housing 3. The brake pads 5, 6 arranged on either side of the brake disc are straddled by the brake housing 3 in a caliper-like fashion and are slidably supported on holding arms 7 projecting over the brake disc for the purpose of transmitting circumferential brake forces. Further, the brake pads 5, 6 are detachably connected to the actuating device 4, on the one hand, and to the axially outward leg of the brake housing, on the other hand.

To adjust a sufficient clearance between the brake pads 5, 6 and the brake disc after a braking operation or brake application, there is provision of a spring assembly which actively lifts the brake pad 5 from the brake disc after brake application. This prevents a friction contact between the brake pad 5 and the brake disc outside the braking phases and the resulting development of residual brake torques. This also prevents an uneven abrasion of material from the brake disc, frequently in the type of local brake washouts. In the embodiments of the spot-type disc brake according to the Figures, the spring assembly acts on one side on the first brake pad 5 which is directly coupled to at least one actuating device 4. The second axially outward brake pad 6 is usually anchored axially on the brake housing 3 and lifted from the brake disc during continued travel, either due to an axial shift of the brake housing 3 or uneven rotations of the brake disc, e.g., brake disc eccentricity. As an alternative, it is also possible to have the spring assembly act also on brake pads 5, 6 on both sides of the brake disc. For the symmetrical spring load on the brake pad 5, it is advisable to arrange the spring assembly with respect to the circumferential direction 9 of the brake disc substantially in the central plane 10 or plane of symmetry of the brake housing 3, that means, between the two actuating devices 4.

Figure 1:
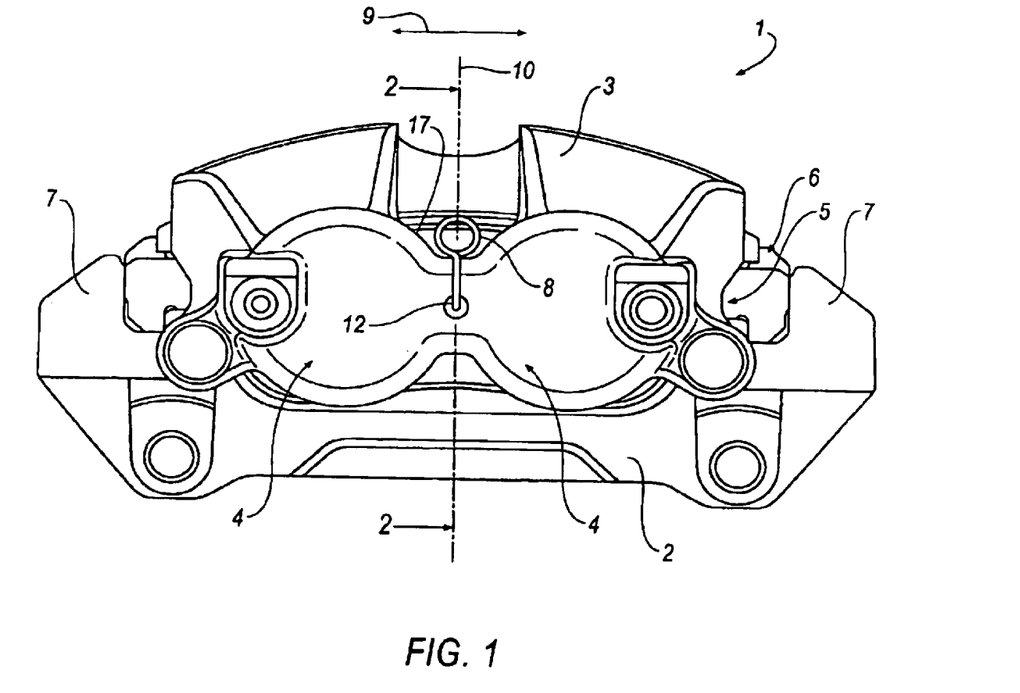
FIG. 1 shows a spot-type disc brake with a spring assembly of the present invention for clearance adjustment including a tension spring.
Figure 2:
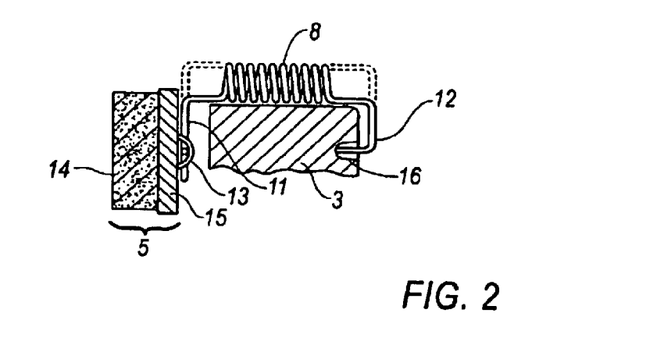
FIG. 2 is a partial cross sectional view taken through lines 2—2 of FIG. 1.

FIGS. 1 and 2 show a first design of the spring assembly with a wound tension spring 8 which, with a first spring end 11, is attached to the carrier plate 15 and, with a second spring end 12, is attached to the brake housing 3. The first spring end 11 is preferably hooked detachably at a shackle 13 on the carrier plate 15, the shackle being fastened to a side of the carrier plate 15 remote from the friction lining 14. Especially, the shackle 13 is secured to the back side of a carrier plate 15, the front side of which carries the friction lining 14. The second spring end 12 is hooked into a bore 16 or other indentation in the brake housing 3 and thus fixed in a detachable manner. However, still other appropriate fastening means are possible for the detachable fixation of the two spring ends 11, 12. The first spring end 11 is secured to the carrier plate 15 so that the point of force application of the tension spring 8 on the carrier plate 15 radially overlaps the force contact area of the actuating devices 4 on the brake pad 5. The result is that a spring force is exerted on the friction lining 14 (through the carrier plate 15) and actively lifts the actuating devices 4 from the brake disc after brake application. Additionally, the point of force application is chosen so as to prevent an inclined positioning of the carrier plate 15 with respect to the friction surface of the brake disc. Further, the tension spring 8 ensures the clearance-free abutment of the carrier plate 15 on the actuating device 4, for example, a brake piston. The actual spiral-type wound tension spring 8 abuts in a protected fashion on the brake housing 3 in an indentation 17 between the actuating devices 4. Consequently, the tension spring does not straddle the brake disc and is hence unaffected by the brake disc rotation. Similar to the design as a tension spring 8, a compression spring is also possible for the adjustment of a clearance.

Figure 3A:
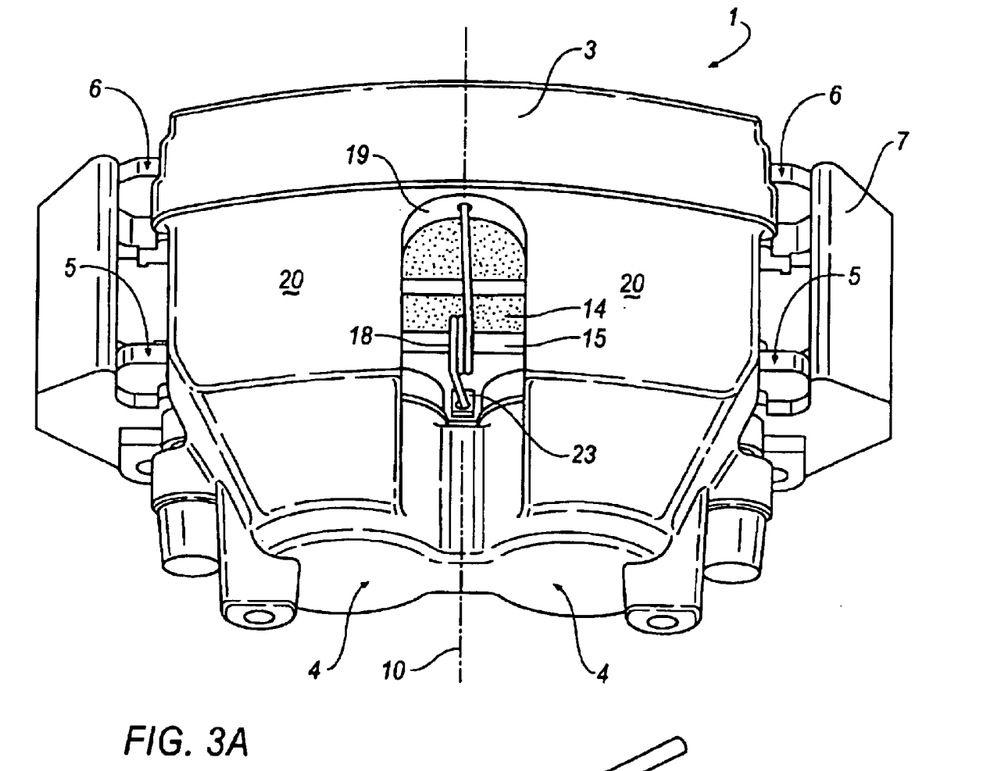
FIG. 3A shows a spot-type disc brake with a second embodiment of the leg spring of the present invention.
Figure 3B:
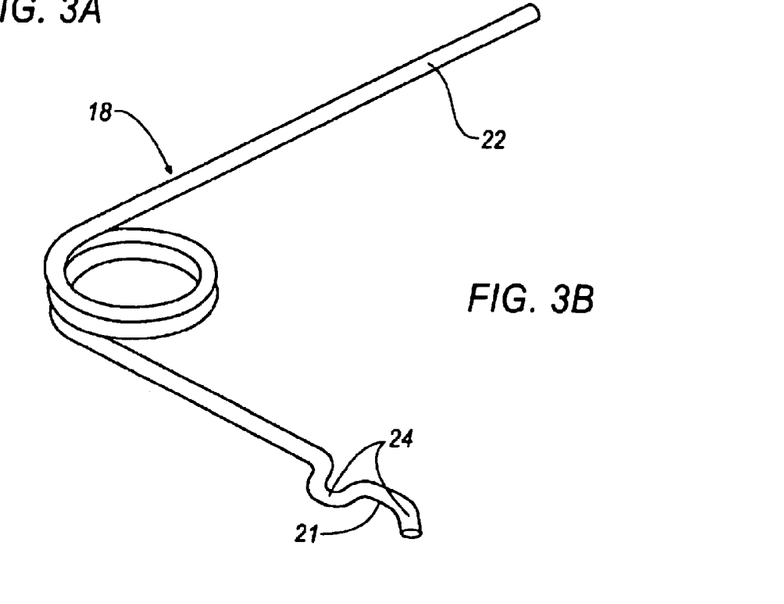
FIG. 3B shows, in isolation, the leg spring of FIG. 3A.

FIGS. 3A and 3B show a second embodiment of the spring assembly for the clearance adjustment with a bending spring that is configured as a wound leg spring 18 that straddles the brake disc. As has already been described hereinabove, the leg spring 18 is arranged substantially in the central plane 10 of the brake housing 3 to preclude an unsymmetrical spring load on the carrier plate 15. This prevents an undesirable inclined positioning of the brake pad 5. In detail, the leg spring 18 is arranged in a recess 19 between two bridge portions 20 of the brake housing 3. With its first leg 21, the leg spring 18 is suspended on a shackle 23 fastened at the brake pad 5. To this end, the first leg 21 includes at its free end appropriate bent spring portions 24 to permit ease of mounting the spring leg 21 at the shackle 23, on the one hand, and to prevent the spring leg 21 from slipping out of the shackle 23, on the other hand. The second leg 22 of the leg spring 18 is supported within the recess 19 on the brake housing 3. As mentioned before, the brake pad 5 is centrally acted upon by spring force also in this case so that an undesirable inclined positioning of brake pads will not occur. In this arrangement, the spring force points away from the brake disc.

Figure 4A:
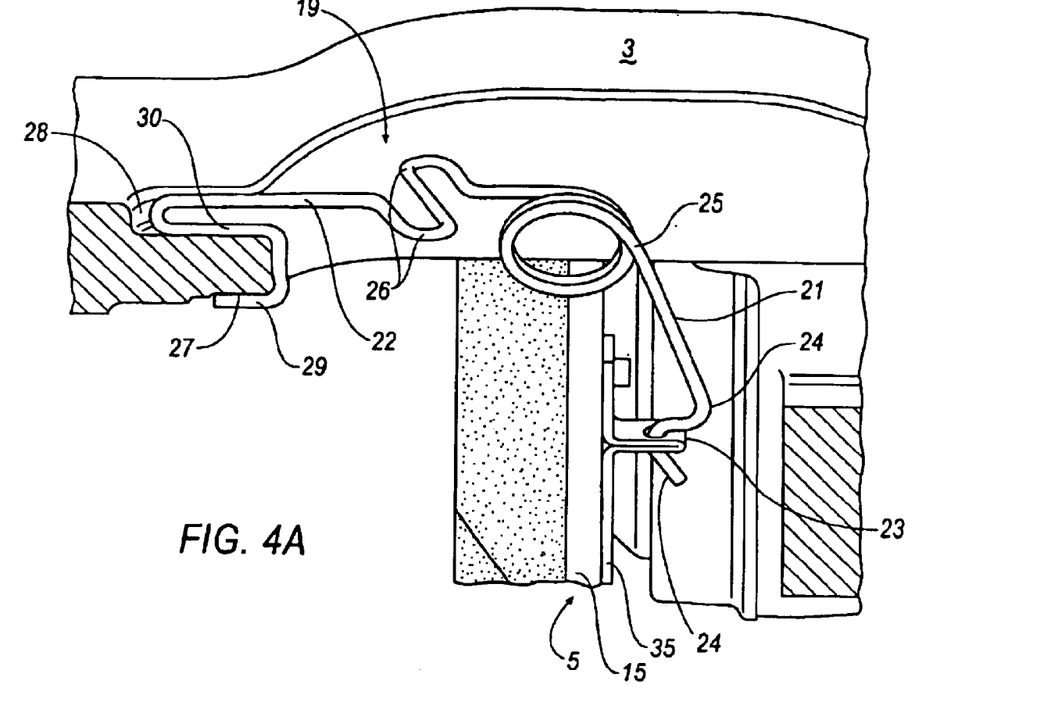
FIGS. 4A and 4B show (top and side) views of an improved spring assembly with a third embodiment of the leg spring of the present invention.
Figure 4B:
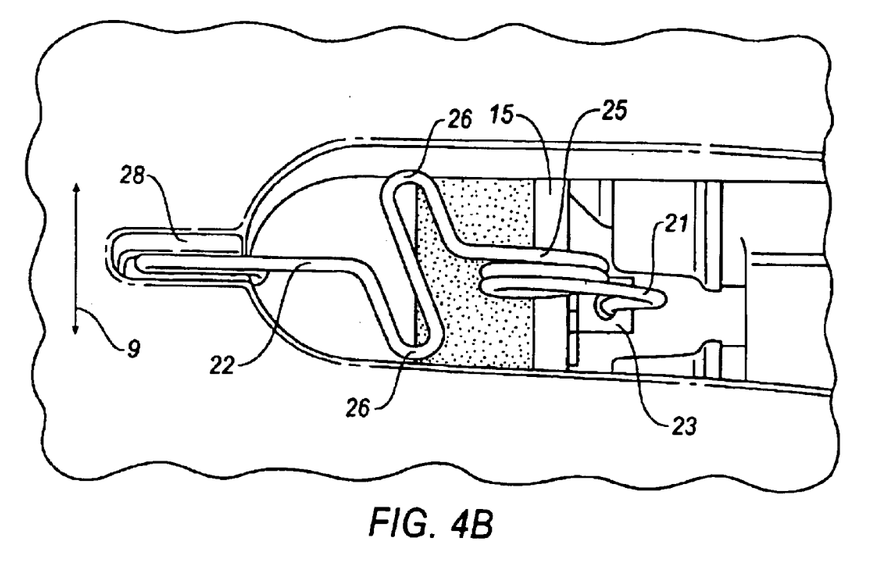

FIGS. 4A and 4B show, in two views, an embodiment of the spring assembly for the clearance adjustment with an improved leg spring 25. The first leg 21 of the leg spring 25 is suspended with free, bent spring portions 24 in the shackle 23 of the brake pad according to the embodiment of FIGS. 3A and 3B. On the other hand, the second leg 22 is supported in a circumferential direction 9 on the brake housing 3 by means of two spring arms 26 which extend opposedly in a circumferential direction. Preferably, the opposing spring arms 26 are symmetrically supported in the recess 19. The support of the spring arms 26 within the recess 19 prevents a tilting movement of the leg spring 25 in a circumferential direction 9. This loss-proof hold of the leg spring 25 in the brake housing 3 is augmented by the support of the second leg 22 on the brake housing 3. To this end, two groove-shaped indentations 27, 28 are shaped radially on the top side or bottom side of the brake housing 3 adjacent to the recess 19 at brake housing 3. The indentations 27, 28 are shaped into the brake housing 3 e.g. by way of a machining operation. The indentations may also be shaped during casting of the brake housing 3 which is especially favorable for the manufacture. The second spring leg 22 abuts in these indentations 27, 28 with matingly configured fastening portions 29, 30, especially under spring bias. This improves the accurate positioning and hold of the leg spring 25 on the carrier plate 15.

Figure 5:
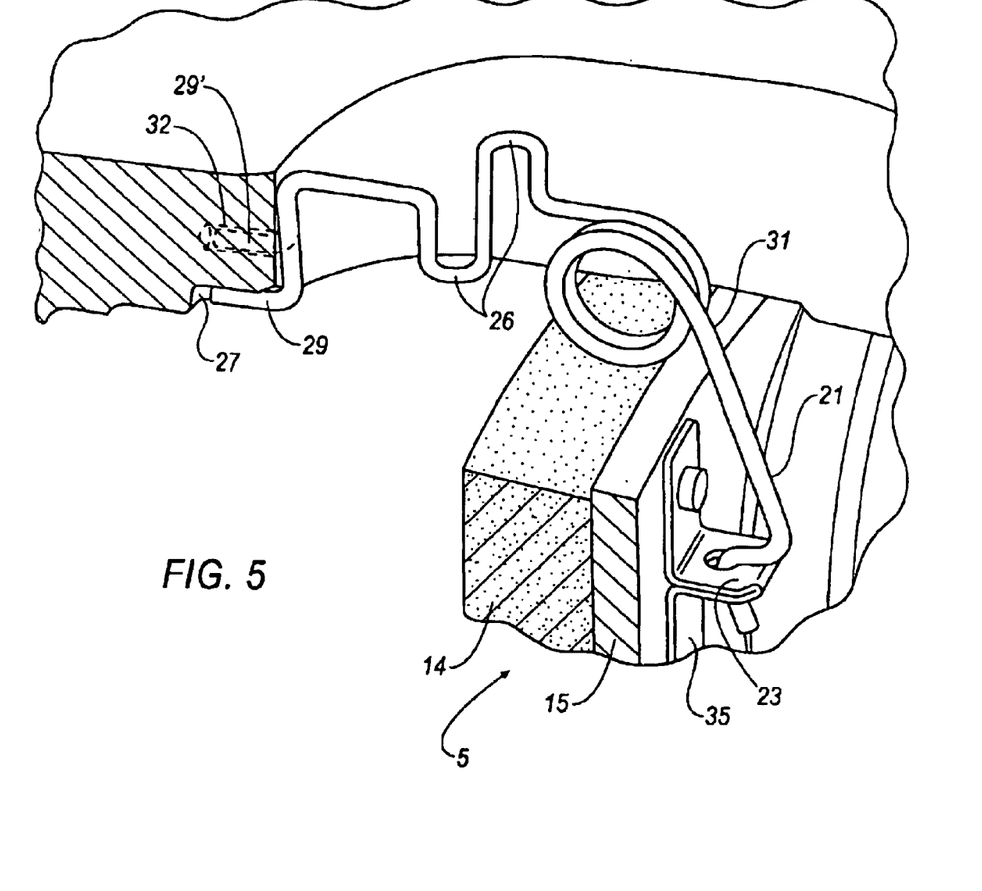
FIG. 5 is a partial view of a spring assembly with a fourth embodiment of the leg spring of the present invention.

FIG. 5 illustrates another variation of a leg spring 31 with a simplified support of the second spring leg 22 on the brake housing 3. Only one indentation 27 is shaped at the radial bottom side of the brake housing 3 in which the associated fastening portion 29 of the leg spring 31 abuts. The support by way of the spring arms 26 which is lateral in a circumferential direction is maintained. In total, the leg spring 31 compared to the embodiment of FIG. 3 can be designed in a simplified fashion with respect to the necessary bending deformations. As an alternative, the fastening portion 29' of the leg spring 31 can also be suspended into a bore 32 at the brake housing 3 in order to safely attach the leg spring 31 to the brake housing 3.

Figure 6A:
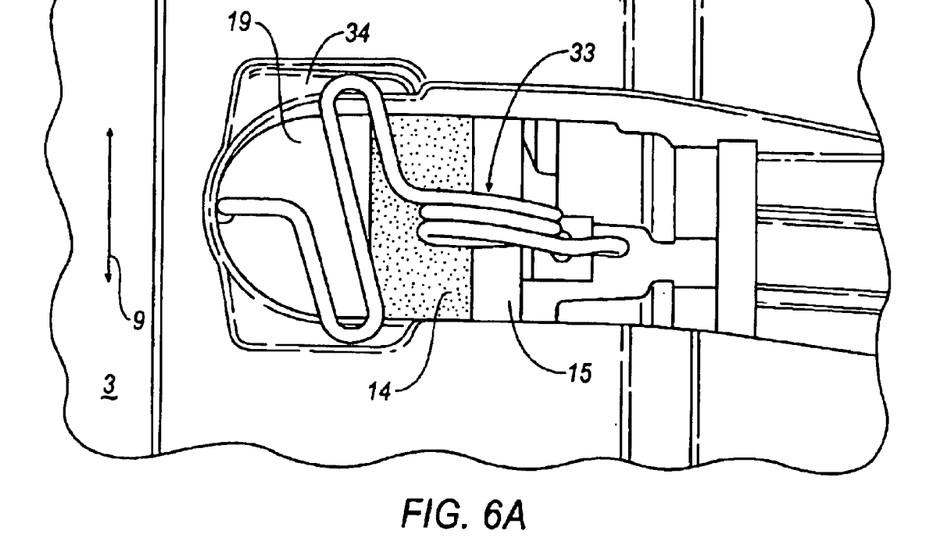
FIGS. 6A and 6B shows two views top and side of a spot-type disc brake with a fifth embodiment of the leg spring of the present invention.
Figure 6B:
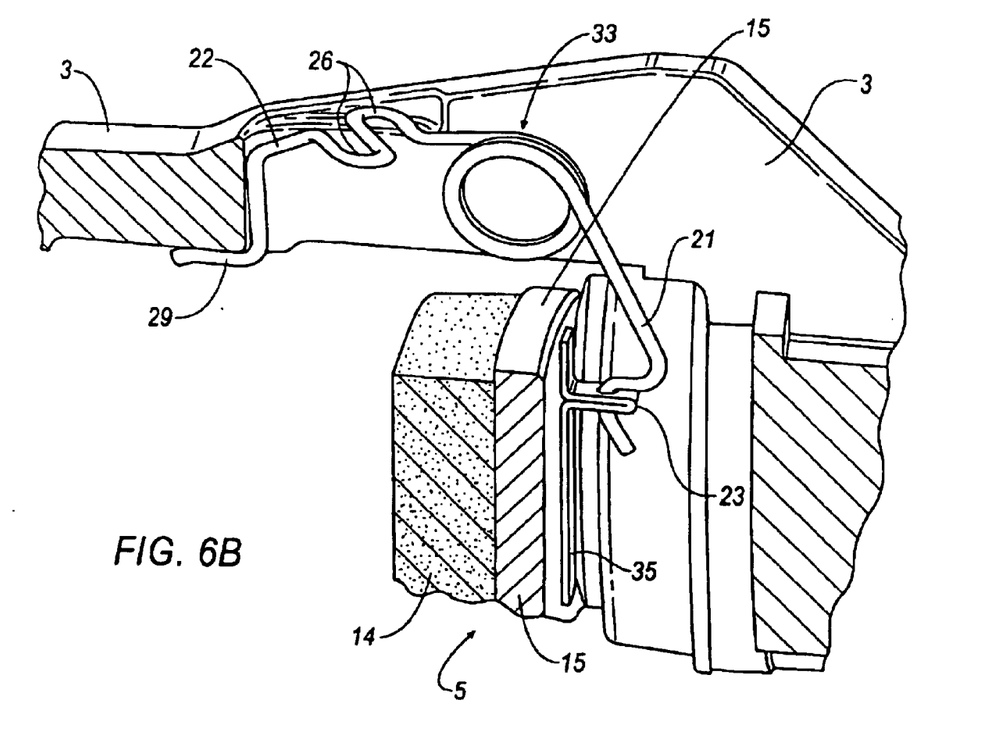

FIGS. 6A and 6B illustrate in two views another variation of the spring assembly, wherein the support of the leg spring 33 in a circumferential direction 9 is improved once more. The spring arms 26 extending in a circumferential direction 9 are arranged in a pocket 34 adjacent to the recess 19 and designed on the radial top side of the brake housing 3. This renders it possible to retain the leg spring 33 not only in a circumferential direction 9 but also in a radially accurate positioning on the brake housing 3. In a way that is favorable under aspects of manufacturing technology, a pocket 34 of this type may also be shaped already during casting fabrication of the housing 3, with the result that there is no more need for machining. Further attachment of the leg spring 33 on the brake pad 5 or on the brake housing 3 is carried out in conformity with the other embodiments.

The actual active spring (8, 18, 25, 33) for the adjustment of clearances is favorably made of spring wire and, accordingly, can be adapted extremely flexibly to any respective installation specifications by means of simple bending operations. In addition, the spring (8, 18, 25, 33) can be made of sheet metal or any other suitable spring material.

The detachable securement of the spring (8, 18, 25, 33) on carrier plate 15 is carried out at an appropriately designed accommodation recess, for example, a shackle (13, 23) according to the Figures. An accommodation recess of this type can be shaped directly into the carrier plate 15, or can be designed on a holding element 35. The holding element 35 is composed of a sheet-metal strip 35 which is fastened to the carrier plate 15 and on which the shackle 23 is provided.

Basically, a spring assembly of the present invention for the adjustment of clearances was described by way of the Figures only in the example of spot-type disc brakes 1 of the floating-caliper type of construction Of course, a spring assembly of this type permits being used also in fixed-caliper spot-type disc brakes.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims.

What is claimed is:

1. A spot-type disc brake assembly, comprising:
   a brake housing;
   at least one actuating device arranged in the brake housing to apply an actuating force to a first brake pad detachably connected to the at least one actuating device;
   a second brake pad detachably connected to the at least one actuating device and anchored axially on the brake housing; and
   a spring assembly having a design that actively lifts and provides a clearance for the first brake pad, wherein the spring assembly is arranged against said first brake pad to preclude an unsymmetrical load on the first brake pad, wherein the spring assembly includes
   a first leg portion which is detachably hooked to a shackle of a carrier plate portion of the first brake pad, wherein said shackle is disposed on a first side of the carrier plate portion opposing a frictional lining portion of the first brake pad, wherein said frictional lining portion is secured on a second side of said carrier plate portion, wherein said frictional lining portion provides a point of force that radially overlaps a spring force that is exerted on a contact area of the first brake pad for actively lifting the first brake pad after a braking application,
   wherein the first leg portion of the spring assembly is supported on the first brake pad in a circumferential direction traversing a central plane of the at least one actuating device,
   wherein the spring assembly is arranged in a recess between two bridge portions of the brake housing,
   wherein the spring assembly includes a second leg portion supported in a circumferential direction on the brake housing by two spring arms supported in the recess, wherein the two spring arms extend opposedly in a circumferential direction in order to prevent tilting movement of the spring assembly.

2. The spot-type disc brake assembly as claimed in claim 1, wherein the spring assembly abuts, in a protected fashion, in an indentation of the brake housing.

3. The spot-type disc brake assembly as claimed in claim 1, wherein the spring assembly includes a second leg portion detachably hooked into a bore in the brake housing.

4. The spot-type disc brake assembly as claimed in claim 1, wherein the first leg portion of the spring assembly, at a free end, includes bent portions to permit ease of mounting the first leg portion at the shackle and to prevent the first leg portion from slipping out of the shackle.

5. The spot-type disc brake assembly as claimed in claim 1, wherein the brake housing includes at least one grooved-shaped indentation.

6. The spot-type disc brake assembly as claimed in claim 5, wherein the at least one grooved-shaped indentation is shaped during casting of the brake housing.

7. The spot-type disc brake assembly as claimed in claim 5, wherein said spring assembly further includes the second leg portion with a free end having at least one matingly configured fastening portion under a spring bias that improves accurate positioning and hold of the second leg portion.

8. The spot-type disc brake assembly as claimed in claim 7, wherein the at least one matingly configured fastening portion includes two matingly configured fastening portions which are received in the at least one grooved-shaped indentation.

9. The spot-type disc brake assembly as claimed in claim 7, wherein the at least one matingly configured fastening portion is received at the grooved-shaped indentation.

10. The spot-type disc brake assembly as claimed in claim 7, wherein the at least one matingly configured fastening portion is received at a fastening portion bore in the brake housing.

11. The spot-type disc brake assembly as claimed in claim 1, wherein the spring arms extending in a circumferential direction are arranged in a pocket adjacent to the recess on the radial top side of the housing, thereby fixing the spring assembly in one of a circumferentially and a radially accurate position on the brake housing.

12. The spot-type disc brake assembly as claimed in claim 11, wherein the pocket is shaped during casting fabrication of the brake housing.

13. The spot-type disc brake assembly as claimed claim 1, wherein the spring assembly is designed as a spiral-type wound tension spring.

14. The spot-type disc brake assembly as claimed claim 1, wherein the spring assembly is designed as a compression spring.

15. The spot-type disc brake assembly as claimed in claim 1, wherein the spring assembly is configured as a leg spring.

16. The spot-type disc brake assembly as claimed in claim 1, wherein said two spring arms of the spring assembly is conformed to an "S" shape.

17. A spot-type disc brake assembly, comprising:
a brake housing including at least one grooved-shaped indentation, wherein the at least one grooved-shaped indentation is shaped during casting of the brake housing;
an actuating device arranged in the brake housing to apply an actuating force to a first brake pad detachably connected to the actuating device;
a second brake pad detachably connected to the actuating device and anchored axially on the brake housing; and
a spring assembly arranged in a recess between two bridge portions of the brake housing having a design that actively lifts and provides a clearance for a frictional lining portion of the first brake pad, wherein the spring assembly is arranged against said first brake pad such that it precludes an unsymmetrical load on the first brake pad, wherein the spring assembly abuts, in a protected fashion, on the brake housing in said at least one groove-shaped indentation, wherein the spring assembly includes:
 a first leg portion which is detachably hooked at a shackle portion of the first brake pad, wherein the shackle resides on a back side of a carrier plate portion of the first brake pad and wherein the frictional lining portion is secured to a front side of said carrier plate portion, wherein said frictional lining portion provides a point of force that radially overlaps a spring force that is exerted on a contact area of the first brake pad for actively lifting the first brake pad after a braking application, wherein the first leg, at a free end, includes:
 bent portions to permit ease of mounting the first leg at the shackle and to prevent the first leg from slipping out of the shackle; and
 a second leg portion in a circumferential direction on the brake housing by two spring arms supported in the recess, which extend opposedly in a circumferential direction in order to prevent tilting movement of the spring assembly, wherein the second leg portion, at a free end, includes:
  two matingly configured fastening portions under a spring bias that improves accurate positioning and holding of said spring assembly, wherein the two matingly configured fastening portions are received at two grooved-shaped indentations of the at least one grooved-shaped indentation.

18. A spot-type disc brake assembly, comprising:
a brake housing including at least one grooved-shaped indentation, wherein the grooved-shaped indentation is shaped during casting of the brake housing;
an actuating device arranged in the brake housing to apply an actuating force to a first brake pad detachably connected to the actuating device;
a second brake pad detachably connected to the actuating device and anchored axially on the brake housing; and
a spring assembly arranged in a recess of the brake housing having a design that actively lifts and provides a clearance for at least one side of the first brake pad, wherein the spring assembly is arranged against said first brake pad such that it precludes an unsymmetrical load on the first brake pad, wherein the spring assembly abuts said at least one grooved-shaped indentation on the brake housing, in a protected fashion wherein the spring assembly includes:
 a first leg portion which is detachably hooked at a shackle portion of the first brake pad, wherein the shackle is attached to a back side of a carrier plate portion of the brake pad and wherein a frictional lining portion of the brake pad is secured to a front side of the carrier plate portion wherein the frictional lining portion provides a point of force that radially overlaps a spring force that is exerted on a contact area of the first brake pad for actively lifting the first brake pad after a braking application, wherein the first leg portion, at a free end, includes:
 bent portions to permit ease of mounting the first leg at the shackle and to prevent the first leg from slipping out of the shackle; and
 a second leg portion in a circumferential direction on the brake housing by two spring arms supported in the recess, which extend opposedly in a circumferential direction in order to prevent tilting movement of the spring assembly, wherein the second leg portion, at a free end, includes:
 a matingly configured fastening portion under a spring bias that improves accurate positioning and holding of said spring assembly, wherein the matingly configured fastening portion is received at one of the at least one grooved-shaped indentation and a fastening portion bore in the brake housing.

19. A spot-type disc brake assembly, comprising:
a brake housing;
an actuating device arranged in the brake housing to apply an actuating force to a first brake pad detachably connected to the actuating device;
a second brake pad detachably connected to the actuating device and anchored axially on the brake housing; and
a spring assembly arranged in a recess between two bridge portions of the brake housing having a design that actively lifts and provides a clearance for at least one side of the first brake pad, wherein the spring assembly is arranged against said first brake pad such that it precludes an unsymmetrical load on the first brake pad, wherein the spring assembly abuts, in a protected fashion, on the brake housing in an indentation of said actuating device, wherein the spring assembly includes:
 a first leg portion which is detachably hooked at a shackle portion of the first brake pad, wherein the shackle is attached to a back side of a carrier plate portion of the brake pad and wherein a frictional lining portion of the brake pad is secured to a front side of a carrier plate portion, said frictional lining portion providing a point of force that radially overlaps a spring force that is exerted on a contact area of the first brake pad for actively lifting the first brake pad after a braking application, wherein the first leg portion of said spring assembly includes a free end, having,
 bent portions to permit ease of mounting the first leg portion at the shackle and to prevent the first leg from slipping out of the shackle; and a second leg portion supported in a circumferential direction on the brake housing by two spring arms supported in the recess, which extend opposedly in a circumferential direction in order to prevent tilting movement of the spring assembly, wherein the spring arms extending in a circumferential direction are arranged in a pocket adjacent to the recess on the radial top side of the housing, thereby fixing the spring assembly in one of a circumferentially and a radially accurate position on the brake housing, wherein the pocket is shaped during casting fabrication of the brake housing.

* * * * *